United States Patent
Kim et al.

(10) Patent No.: US 7,330,438 B2
(45) Date of Patent: Feb. 12, 2008

(54) APPARATUS FOR TRANSCEIVING PACKETS IN WDM-PON

(75) Inventors: Byoung Whi Kim, Daejeon (KR); Hyun Ho Yun, Daejeon (KR); Hyeong Ho Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 630 days.

(21) Appl. No.: 11/007,017

(22) Filed: Dec. 7, 2004

(65) Prior Publication Data

US 2005/0129401 A1 Jun. 16, 2005

(51) Int. Cl.
*H04L 12/26* (2006.01)
(52) U.S. Cl. .................. 370/249; 370/392
(58) Field of Classification Search ........... 370/456, 370/389, 392, 249
See application file for complete search history.

(56) References Cited

U.S. PATENT DOCUMENTS 5,043,976 A * 8/1991 Abiven et al. ............ 398/136
6,546,014 B1 4/2003 Kramer
7,218,861 B2 * 5/2007 Totsuka et al. ............ 398/135

* cited by examiner

*Primary Examiner*—Brenda Pham
(74) *Attorney, Agent, or Firm*—Blakely Sokoloff Taylor & Zafman (57) ABSTRACT

Provided is an apparatus that enables improvement of efficiency of up/downstream packet tensception by reflecting a plurality of variables of packet transmission, such as a temporal variety of packet lengths, asymmetry of downstream and upstream traffics, and an instantaneous burst of a traffic amount, on a loop-back-based WDM-PON. The apparatus includes: a downstream code sensor sensing an idle code from a downstream data frame to be transmitted to an optical network terminal (ONT); a trailer transmission controller receiving an idle code sensing signal from the downstream code sensor and forming a trailer of the downstream data frame (hereinafter, a downstream trailer) by adding overhead for a reception control of the downstream data frame by the ONT and a transmission control of an upstream data frame to be loop-back-transmitted from the ONT; an upstream code sensor receiving and sensing a trailer of the loop-back-transmitted upstream data frame (hereinafter, an upstream trailer); and a trailer reception controller receiving overhead information, which is added by the ONT, for a reception control of the upstream data frame from the upstream code sensor and controlling a reception of the upstream data frame.

6 Claims, 12 Drawing Sheets

APPARATUS FOR TRANSCEIVING PACKETS IN WDM-PON

BACKGROUND OF THE INVENTION

This application claims the priority of Korean Patent Application No. 2003-89359, filed on Dec. 10, 2003, and No. 2004-89722, filed on Nov. 5, 2004 in the Korean Intellectual Property Office, the disclosures of which are incorporated herein in their entirety by reference.

1. Field of the Invention

The present invention relates to a wavelength division multiplexing-passive optical network (WDM-PON)-based packet transceiver, and more particularly, to an apparatus that can improve the efficiency of up/downstream packet transceiving by reflecting a plurality of variables of packet transmission, such as a packet lengths, asymmetry of downstream and upstream traffics, and an instantaneous burst of a traffic amount, on a WDM-PON in which a light source is not used in an optical network terminal (ONT), so called a loop-back based WDM-PON.

2. Description of the Related Art

Since a loop-back based ONT (LB-ONT) in a WDM-PON is an ONT, which does not require a light source to which a wavelength is designated, there exist advantages in terms of manufacturing, management, and installation of products. However, since the ONT must use downstream light as upstream light by loop-backing the downstream light in the ONT, upstream information and downstream information must be distinguished.

Two methods for a loop-back based WDM-PON using downstream light as upstream light have been suggested.

First, there is an interleave method of arranging upstream information and downstream information not to be temporally overlapped. The interleave method is divided into a packet interleave method of arranging upstream packets and downstream packets to temporally cross and a bit interleave method of alternatively arranging upstream bits and downstream bits.

Second, there is a superposed modulation method of transmitting a downstream optical signal to an ONT by making the modulation depth of the downstream optical signal low and modulating the downstream optical signal with upstream information after making a modulated optical power uniform to some degree by amplifying the modulated optical power in a saturated-gain region. Or by making the modulation depth of the the upstream optical signal high and extracting upstream information in an OLT receiver regardless of the low modulated downstream optical signal by modulating upstream data using the downstream optical signal.

Problems of the methods described above are as follows.

1) Packet and bit interleave methods

Packet or bit interleave synchronization between an OLT and an ONT is necessary.

Can be difficultly applied to packets having variable lengths, and segmentation assembly and reassembly (SAR) for the packet interleave is required.

When asymmetry between a downstream and an upstream is greater, a waste of bandwidth is more increased.

2) Superposed modulation method

Since a modulation depth of a downstream optical signal is low or since a modulation depth of an upstream optical signal is high, error occurrence possibility is high.

A modulation depth of a downstream optical signal must be adjusted according to a distance between an OLT and an ONT, and it is difficult to change a distance between subscribers.

In order to amplify an optical power modulated by an ONT in a saturated-gain region, expensive devices, such as a preamplifier, a semiconductor optical amplifier (SOA), and an external optical modulator, are necessary.

SUMMARY OF THE INVENTION

The present invention provides a packet transceiver having high efficiency of up/downstream packet transceiving by reflecting a plurality of variables of packet transmission, such as packet lengths, asymmetry of downstream and upstream traffics, and an instantaneous burst of a traffic amount, on a WDM-PON.

According to an aspect of the present invention, there is provided a first apparatus for transceiving packets in a WDM-PON, the apparatus comprising: a downstream code perceiving part perceiving an idle code from a downstream data frame to be transmitted to an optical network terminal (ONT); a trailer transmitting control part receiving an idle code perceiving signal from the downstream code perceiving part and forming a downstream trailer of the downstream data frame by adding an overhead for a reception control of the downstream data frame by the ONT and a transmission control of an upstream data frame to be loop-back transmitted from the ONT; an upstream code perceiving part receiving and perceiving an upstream trailer of the loop-back transmitted upstream data frame; and a trailer receiving control part controlling a receiving of the upstream data frame after receiving overhead information, which is added by the ONT, for a receiving control of the upstream data frame from the upstream code perceiving part.

According to another aspect of the present invention, there is provided a second apparatus for transceiving packets in a WDM-PON, the apparatus comprising: a downstream code perceiving part receiving and perceiving a downstream trailer, to which overhead for a receiving control of a downstream data frame transmitted from an optical line terminal (OLT) is added; a trailer receiving control part receiving a perceiving signal of the downstream trailer from the downstream code perceiving part and controlling a receiving of the downstream data frame; a TS processing part analyzing trailer size (TS) information of an upstream data frame to be loop-back-transmitted to the OLT by receiving the perceiving signal of the downstream trailer from the downstream code sensor; an upstream code perceiving part perceiving an idle code from the upstream data frame to be loop-back transmitted to the OLT; and a trailer transmission control part forming an upstream trailer by adding overhead for a transmission control of the upstream data frame after receiving an idle code perceiving signal from the upstream code perceiving part, a downstream trailer perceiving signal from the downstream code perceiving part, and the TS information from the TS processing part.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will now be described more fully with reference to the accompanying drawings, in which embodiments of the invention are shown. Like reference numbers are used to refer to like elements through at the drawings.

Figure 1:
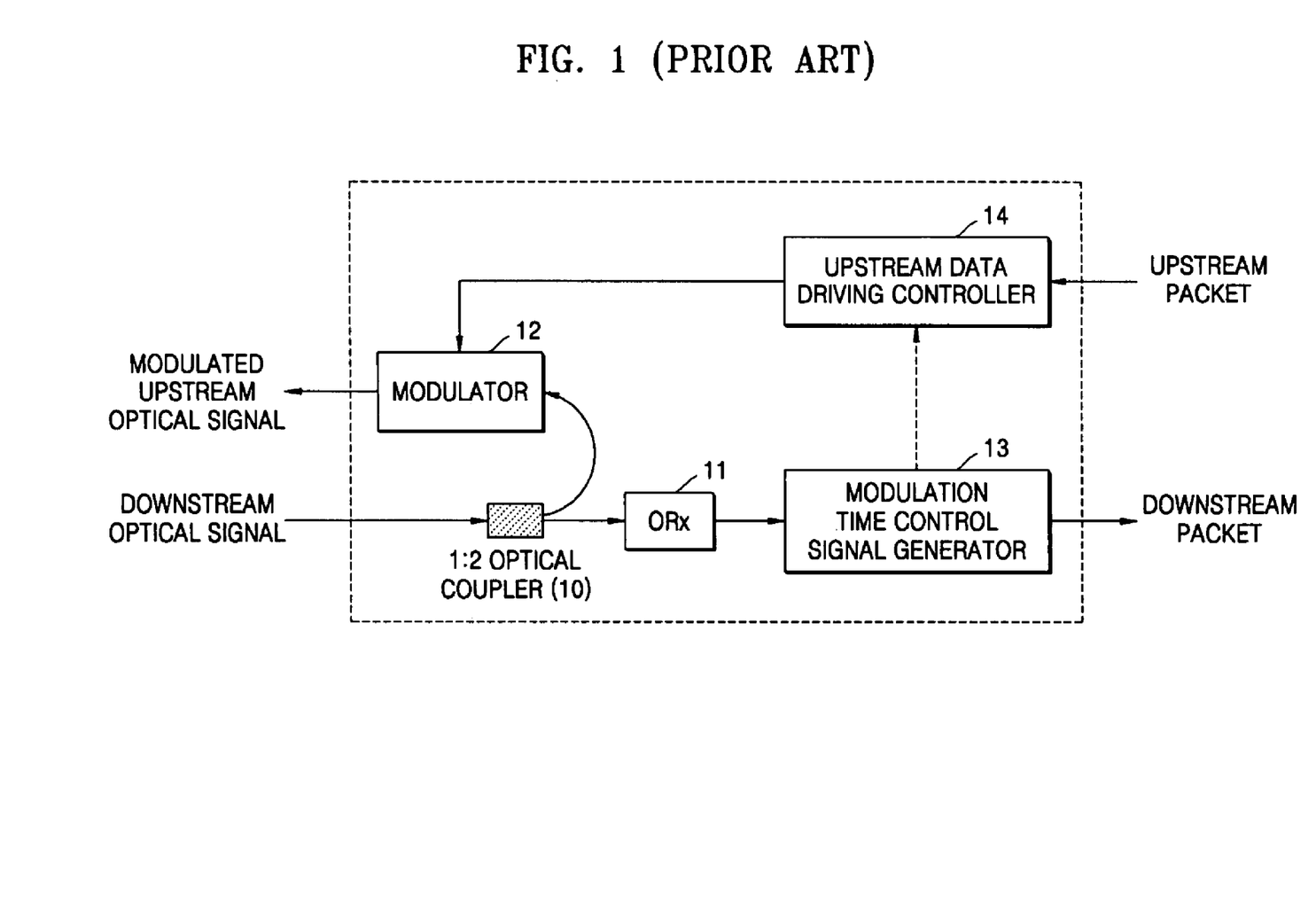
FIG. 1 is a block diagram of a conventional LB-ONT.

FIG. 1 is a block diagram of a conventional LB-ONT.

Referring to FIG. 1, in the ONT, a 1:2 optical coupler 10 distributes an optical power of a downstream optical signal to an optical receiver (ORx) 11 and a modulator 12.

The downstream optical signal input to the ORx 11 is converted to an electrical signal and input to a modulation timing control signal generator 13. The modulation timing control signal generator 13 determines start timing and end timing for modulating upstream data by loop-backing the downstream optical signal and transmits a timing control signal corresponding to the timings to an upstream data driving controller 14.

The upstream data driving controller 14 outputs or does not output the upstream data to the modulator 12 in response to the timing control signal. The modulator 12 modulates the upstream data by receiving the downstream optical signal and transmits the modulated upstream optical signal to the OLT.

Figure 2:
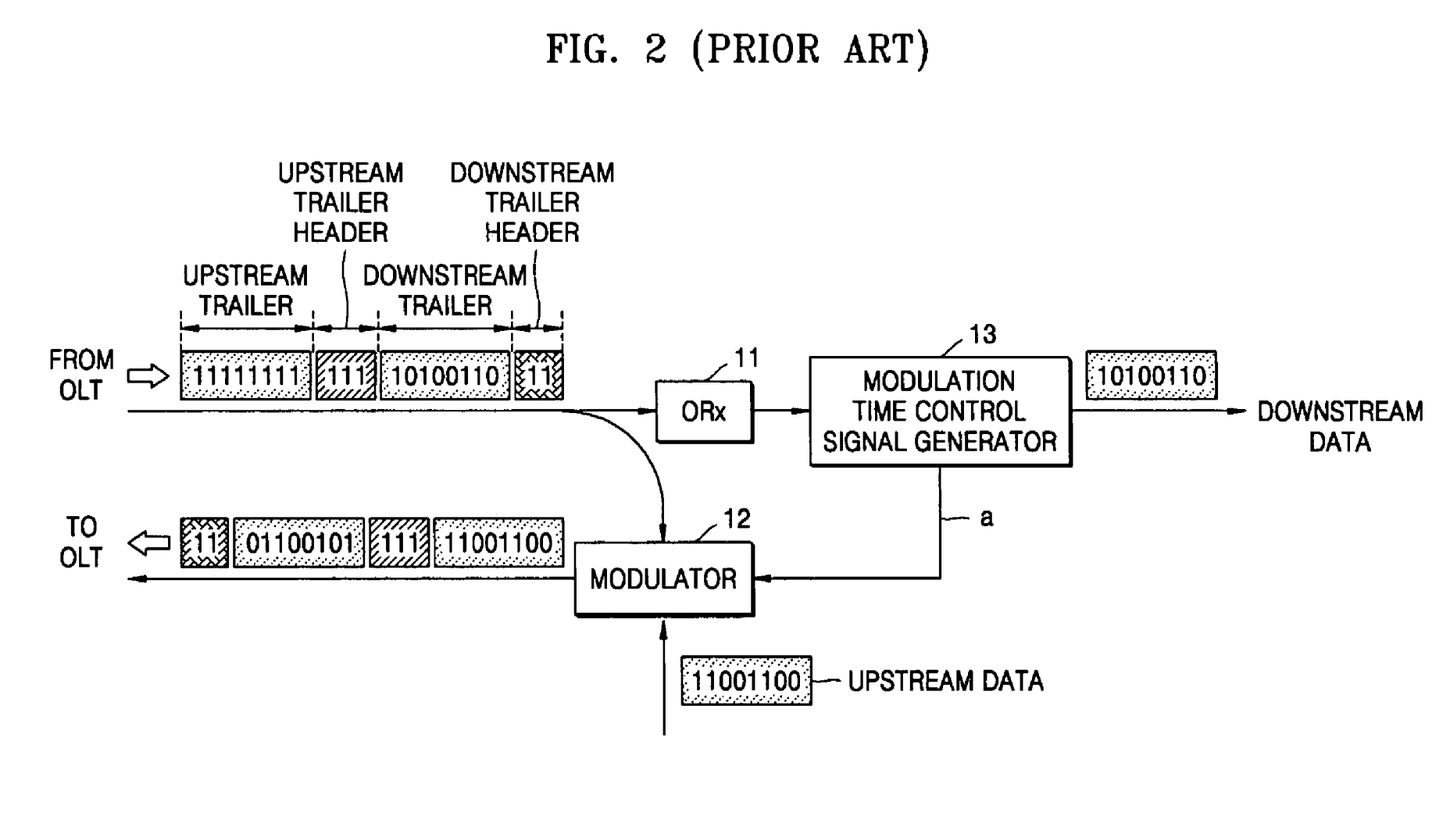
FIG. 2 illustrates a concept of a loop-back transmission method using the ONT of FIG. 1.

FIG. 2 illustrates a concept of a loop-back transmission method using the ONT of FIG. 1.

Referring to FIG. 2, a downstream data frame transmitted from the OLT to the ONT includes a downstream trailer having a downstream data packet and an upstream trailer in which an upstream data packet is going to be loaded. A unique trailer header is added to each trailer for identification of the upstream and downstream and a control required for transmission.

Unlike the downstream trailer having meaningful data, the upstream trailer has unmodulated data, i.e., meaningless data, and the unmodulated data included in the upstream trailer is replaced by modulated upstream data to be transmitted to the OLT by being controlled by the modulation timing control signal generator 13. The size of each trailer is automatically determined by the OLT according to a user request or a traffic status.

Figure 3:
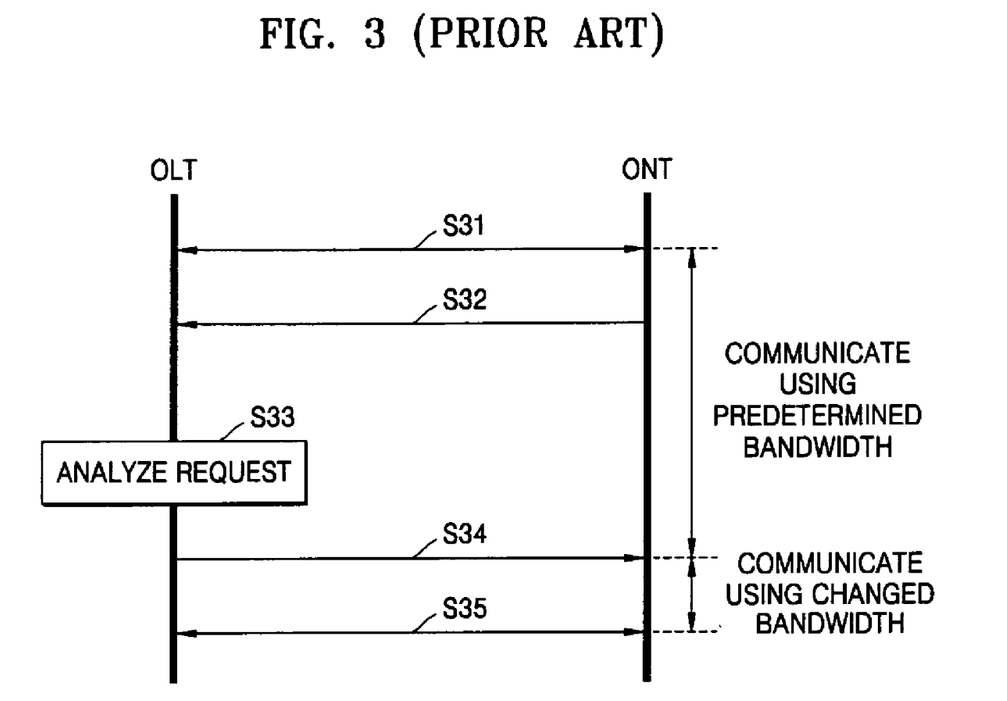
FIG. 3 illustrates a loop-back protocol for a dynamic control of upstream and downstream bandwidths.

FIG. 3 illustrates a loop-back protocol for a dynamic control of upstream and downstream bandwidths.

Referring to FIG. 3, communication between an OLT and an ONT is performed using upstream and downstream trailers having a predetermined size in operation S31. When a bandwidth change is requested by a user, the ONT requests bandwidth adjustment of the OLT in operation S32. The OLT analyzes the bandwidth adjustment request in operation S33 and transmits whether the adjustment request is granted or not to the ONT in operation S34. When the adjustment request is granted, communication between the OLT and the ONT is performed using a changed bandwidth in operation S35.

Figure 4:
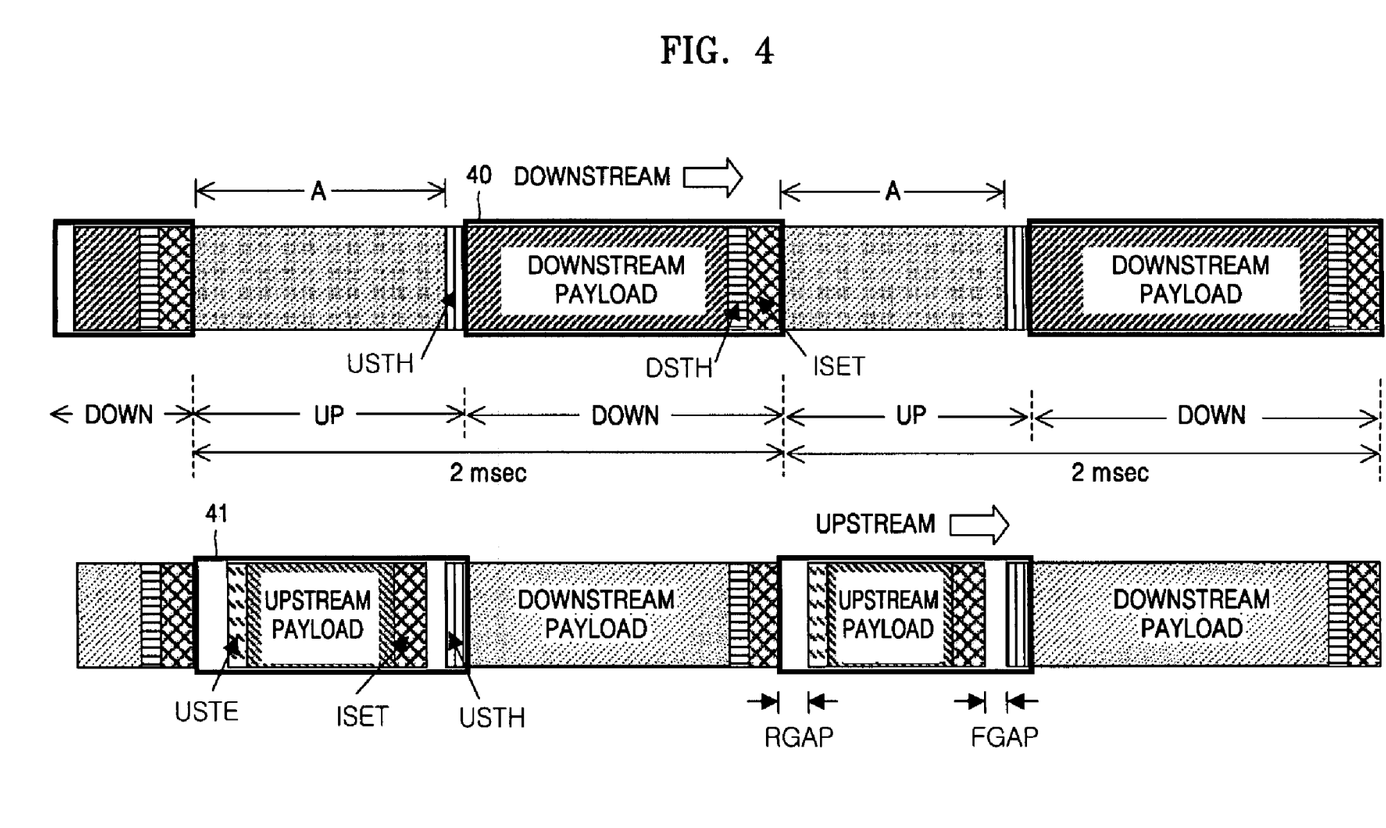
FIG. 4 illustrates a detailed configuration a data frame transmitted using the loop-back transmission method.

FIG. 4 illustrates a detailed configuration a data frame transmitted using the loop-back transmission method. In FIGS. 4 through 8, stream blocks shown using the same color or symbol are all the same.

Referring to FIG. 4, a downstream trailer 40 includes an idle set (ISET), a downstream trailer header (DSTH), a downstream payload. The ISET is inserted so that a receiver end, i.e., an ONT, can detect the bit period of(synchronize) a received packet. That is, the ISET is always inserted after a period A in which bit information does not exist so that the ONT can detect the bit period of a received packet. When a packet is transmitted via a network, the receiver can detect bit information only when the receiver senses an exact cycle of the transmitted packet. Since the bit information cannot be detected if bits are suddenly input to the receiver, an OLT inserts and transmits ISET which includes bits having a predetermined pattern to the receiver, i.e., the ONT so that the ONT can detect the bit period.

The DSTH is a specific pattern used to indicate a beginning point of downstream data. For example, one of 500 code groups that are not used among the 10B (802.3z) code groups can be selected for the DSTH. As described in FIG. 2, a downstream trailer transmitted from an OLT to an ONT is feedbacked with an upstream trailer transmitted from the ONT to the OLT according to features of the loop-back transmission method. Therefore, a main purpose of the DSTH is to remove the feedbacked downstream trailer by distinguishing the downstream trailer from the upstream trailer.

Data to be transmitted from the OLT to the ONT, i.e., data to be actually provided to a user, is carried on the downstream payload.

An upstream trailer 41 includes an upstream trailer header (USTH), a front gap (FGAP), an ISET, an upstream payload, an upstream trailer end (USTE), and a rear gap (RGAP). The USTH is a specific pattern used to indicate a beginning point of upstream data. For example, one of 499 code groups except the code group used for the DSTH among the 10 B (802.3z) code groups that are not used can be selected for the USTH. The USTH is used to provide the beginning point for carrying data on the upstream trailer 41 to be transmitted from the ONT to the OLT and used for the OLT to distinguish the upstream trailer 41 from signals received to the OLT.

The FGAP is a time taking for operations that an ONT receiving processing unit detects the USTH from a downstream frame and requests an ONT transmission processing unit to load upstream data on the upstream trailer 41 and that the ONT transmission processing unit loads upstream data on the upstream trailer 41 in response to the request. The FGAP varies according to ONT systems. The ISET is inserted so that an OLT receiving processing unit can detect the bit period of the upstream data packet since bit information does not exist for the FGAP duration.

Data to be transmitted from the ONT to the OLT, i.e., data requested by a user, is carried on the upstream payload. The USTE indicates the end of the upstream trailer 41, and the OLT receiving processing unit recognizes an end point of the upstream trailer 41 by detecting the USTE. The RGAP is inserted to prevent the upstream trailer 41 from being overlapped with a subsequent downstream trailer.

Trailers are repeated in a predetermined cycle, the cycle of 2 msec illustrated in FIG. 4 is only an example. In the present embodiment, by controlling frequencies and locations of trailer headers, up/downstream bandwidths can be controlled according to transmission amounts, and a cycle of trailers can be flexibly and easily changed.

Overhead, such as DSTH, ISET, RGAP, USTE, FGAP and USTH, used to support the loop back protocol (LBP) transmission method is, for example, calculated as follows:

$$\text{Overhead} = \text{DSTH}(20 \text{ bits}) + \text{ISET}(1000 \text{ bits}) + \text{RGAP} + \text{USTE}(20 \text{ bits}) + \text{ISET}(1000 \text{ bits}) + \text{FGAP} + \text{USTH}(40 \text{ bits}) = 2100 \text{ bits} + 200 \text{ bits}(80 \text{ nsec assumed for FGAP and RGAP}) = 2280 \text{ bits}$$

$$\text{Overhead/cycle} = [2280/(1.25*10^9*2*10^{-3})] *100 = 0.046\%$$

Therefore, the overhead per cycle is less than 0.1%, i.e., very little.

Figure 5:
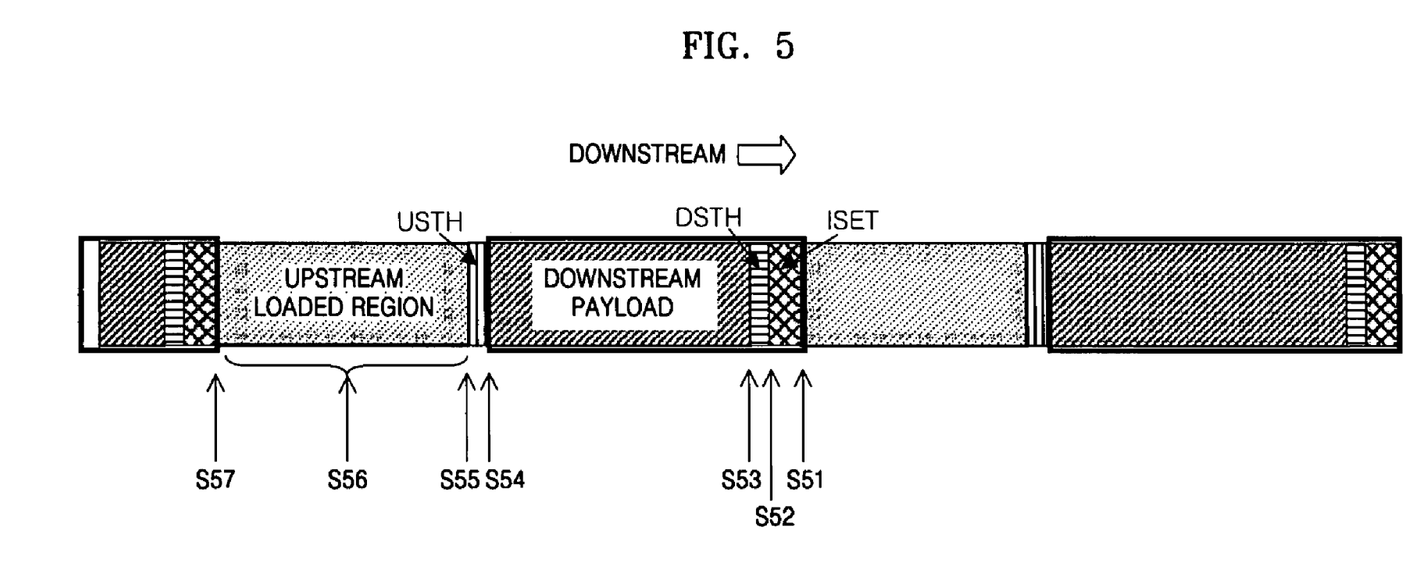
FIG. 5 illustrates an event generated due to insertion of an overhead, which complies with a downstream packet format, when an OLT transmits a downstream packet (frame) to an ONT.
Figure 9A:
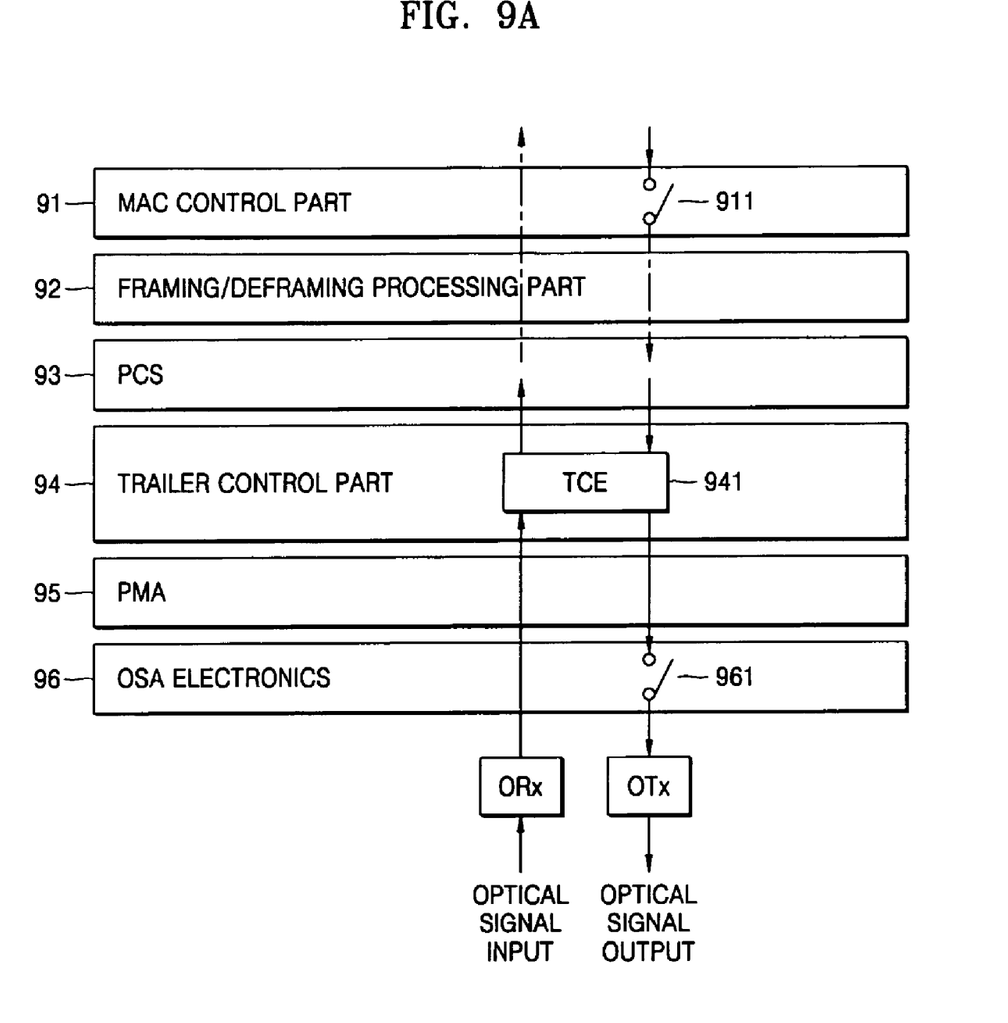
FIG. 9A illustrates a configuration of communication protocol layers installed in an OLT according to an embodiment of the present invention.

FIG. 5 illustrates an event generated with insertion of overhead, which complies with a downstream packet format, when an OLT transmits a downstream packet (frame) to an ONT. FIG. 9A will be quoted for convenience of understanding.

The OLT allows an ISET to be transmitted to a trailer control engine (TCE) 941 by turning off a switch 911 of a media access control (MAC) control part 91 and turning on a driver switch 961 in operation S51.

The TCE 941 counts idle code bits, e.g., 1000 bits, and then starts inserting a DSTH in operation S52. Here, the counted number is the number of bits of the ISET.

After inserting the DSTH, the OLT turns on the switch 911 of the MAC control part 91 and then commands the TCE 941 to start inserting a user service data unit (SDU) into a downstream payload in operation S53.

Before a USTH is inserted, the TCE 941 cuts off the SDU transmission by turning off the switch 911 of the MAC control part 91 in order to prevent a frame loss and inserts the USTH in operation S54.

After inserting the USTH, the TCE 941 turns off the driver switch 961 after waiting for a guard time in order to guarantee for the USTH to pass through an transmitter end (OTx) of the OLT in operation S55.

The TCE 941 calculates a region in which upstream data is loaded by counting the idle code bits in operation S56.

Operations 51 through 56 are repeated in operation S57.

Figure 6:
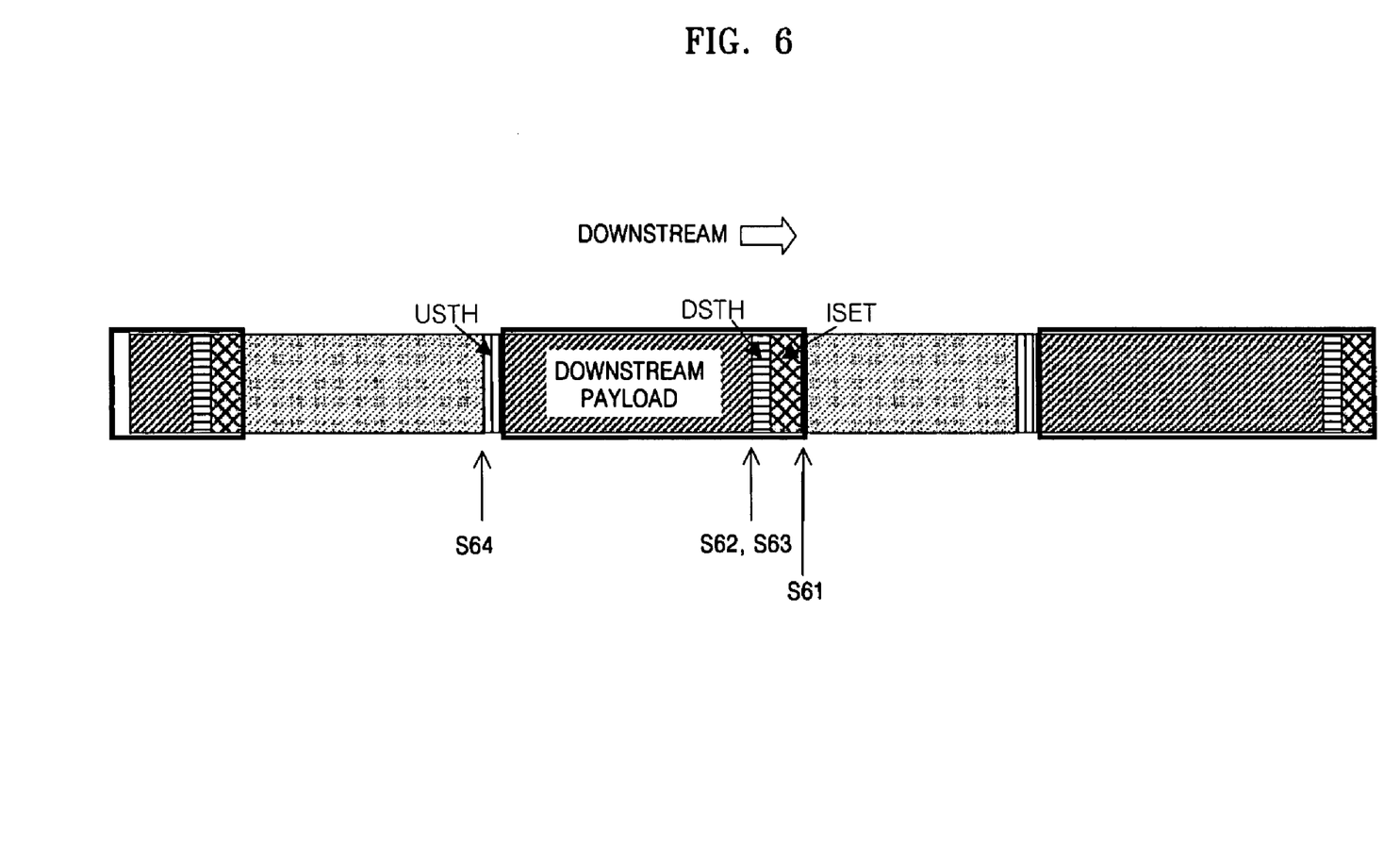
FIG. 6 illustrates an event generated due to processing of the overhead, which complies with a downstream packet format, when an ONT receives a downstream packet (frame)
Figure 10A:
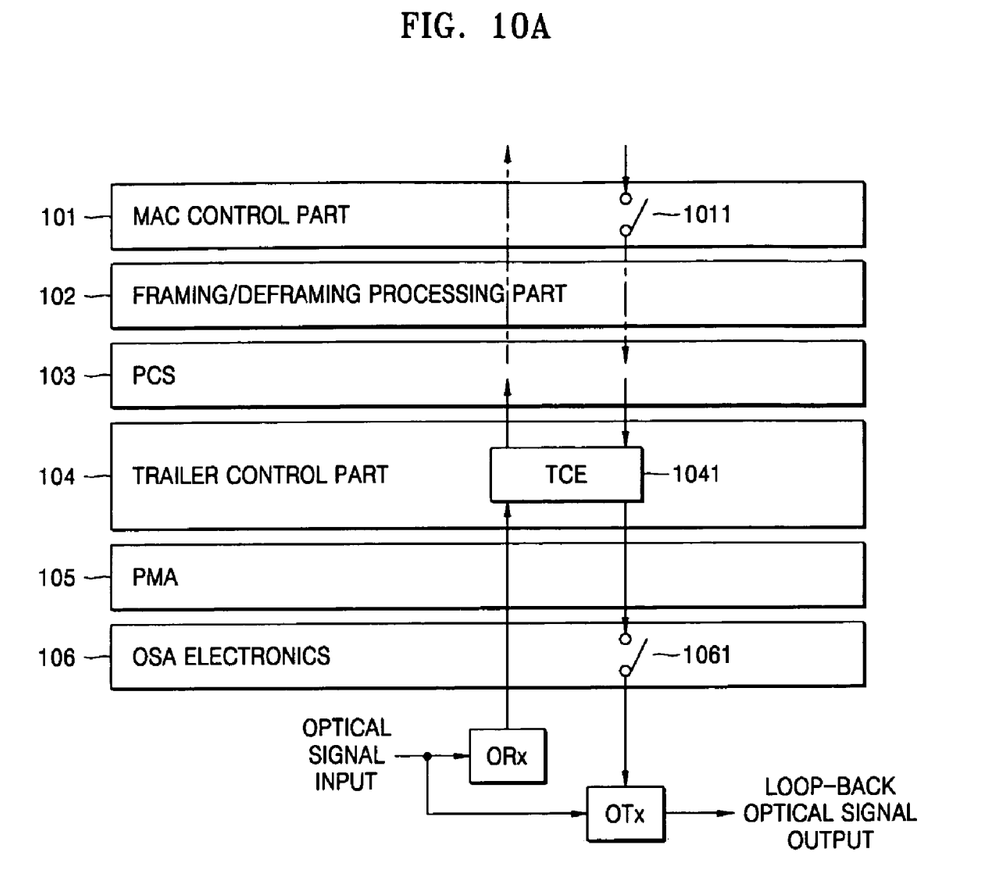
FIG. 10A illustrates a configuration of communication protocol layers installed in an ONT according to an embodiment of the present invention.

FIG. 6 illustrates an event generated with processing of the overhead, which complies with a downstream packet format, when an ONT receives a downstream packet (frame). FIG. 10A will be quoted for convenience of understanding.

A physical medium attachment (PMA) 105 of a receiving processing unit of the ONT takes a clock/code block sync using an idle ordered set in a resync mode in operation S61.

A TCE 1041 of the receiving processing unit of the ONT checks that a physical coding sublayer (PCS) 103 is in a sync mode and then detects a DSTH in operation S62. The TCE 1041 substitutes the DSTH by an idle code so that the PMA 105 and the PCS 103 operate in the same mode in operation S63.

The TCE 1041 makes both the PMA 105 and the PCS 103 operate in the resync mode by transmitting a USTH to the PCS 103 in operation S64.

Figure 7:
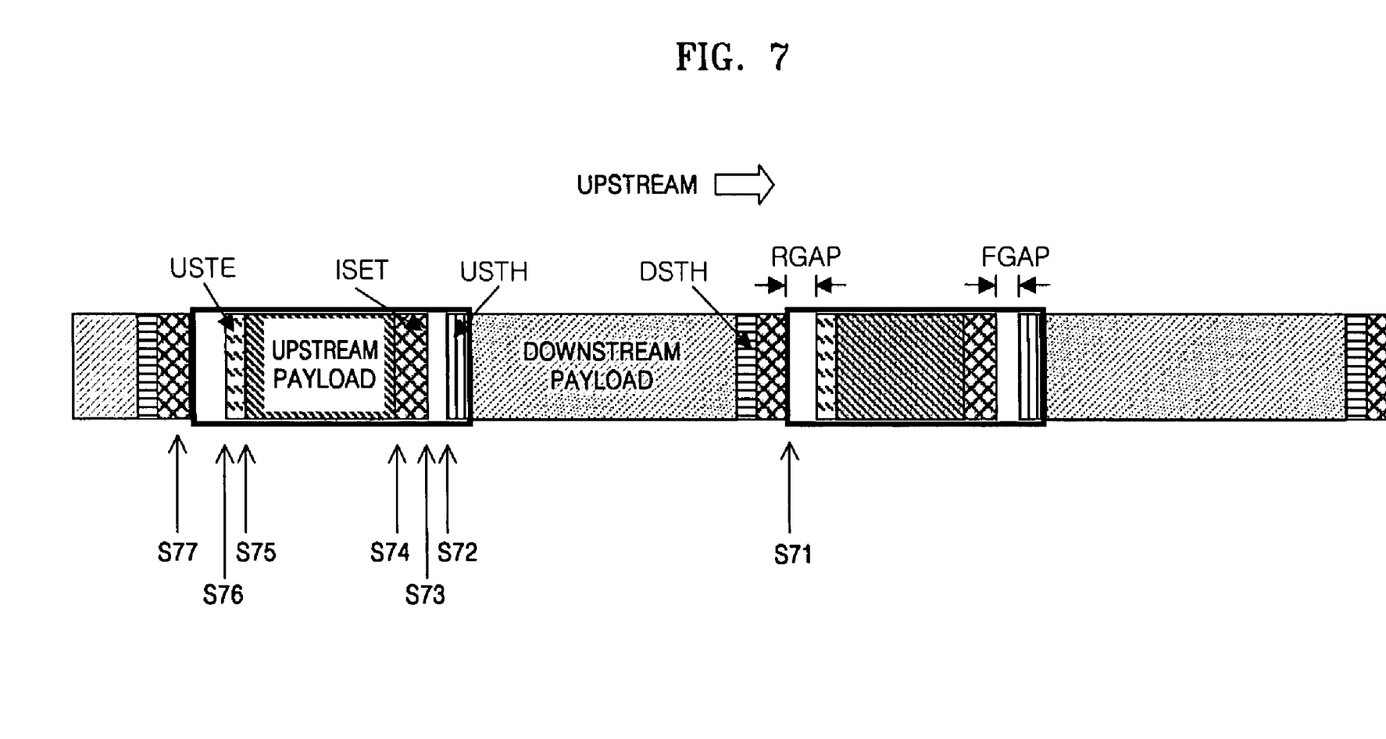
FIG. 7 illustrates an event generated due to insertion of an overhead, which complies with an upstream packet format, when an ONT transmits a downstream packet (frame) to an OLT.

FIG. 7 illustrates an event generated with insertion of overhead, which complies with an upstream packet format, when an ONT transmits a downstream packet (frame) to an OLT. FIG. 10A will be quoted for convenience of understanding.

The ONT prevents any signal from being transmitted by turning off a switch 1011 of a MAC control part 101 and a driver switch 1061 in operation S71.

The TCE 1041 detects a USTH, calculates a trailer size (TS) from the USTH, and calculates a length of an upstream trailer in operation S72. The driver switch 1061 is maintained in an off state during a predetermined time (FGAP) after detecting the USTH in order to prevent a collision between an idle code to be inserted by the ONT and an idle code that may be attached next the USTH when an OLT inserts the USTH to transmit downstream data.

The ONT inserts the idle code (ISET) into the upstream trailer by turning on the driver switch 1061 in operation S73.

The TCE 1041 starts inserting data requested by a user into an upstream payload by turning on the switch 1011 in operation S74.

Before a USTE is inserted into the upstream trailer, the TCE 1041 cuts off the SDU transmission by turning off the switch 1011 in order to prevent a frame loss and inserts the USTE into the upstream trailer in operation S75.

After inserting the USTE into the upstream trailer, a predetermined time (RGAP) is required in order to guarantee for the USTE to pass through an transmitter end (OTx) of the ONT in operation S76.

Operations 71 through 76 are repeated in operation S77.

Figure 8:
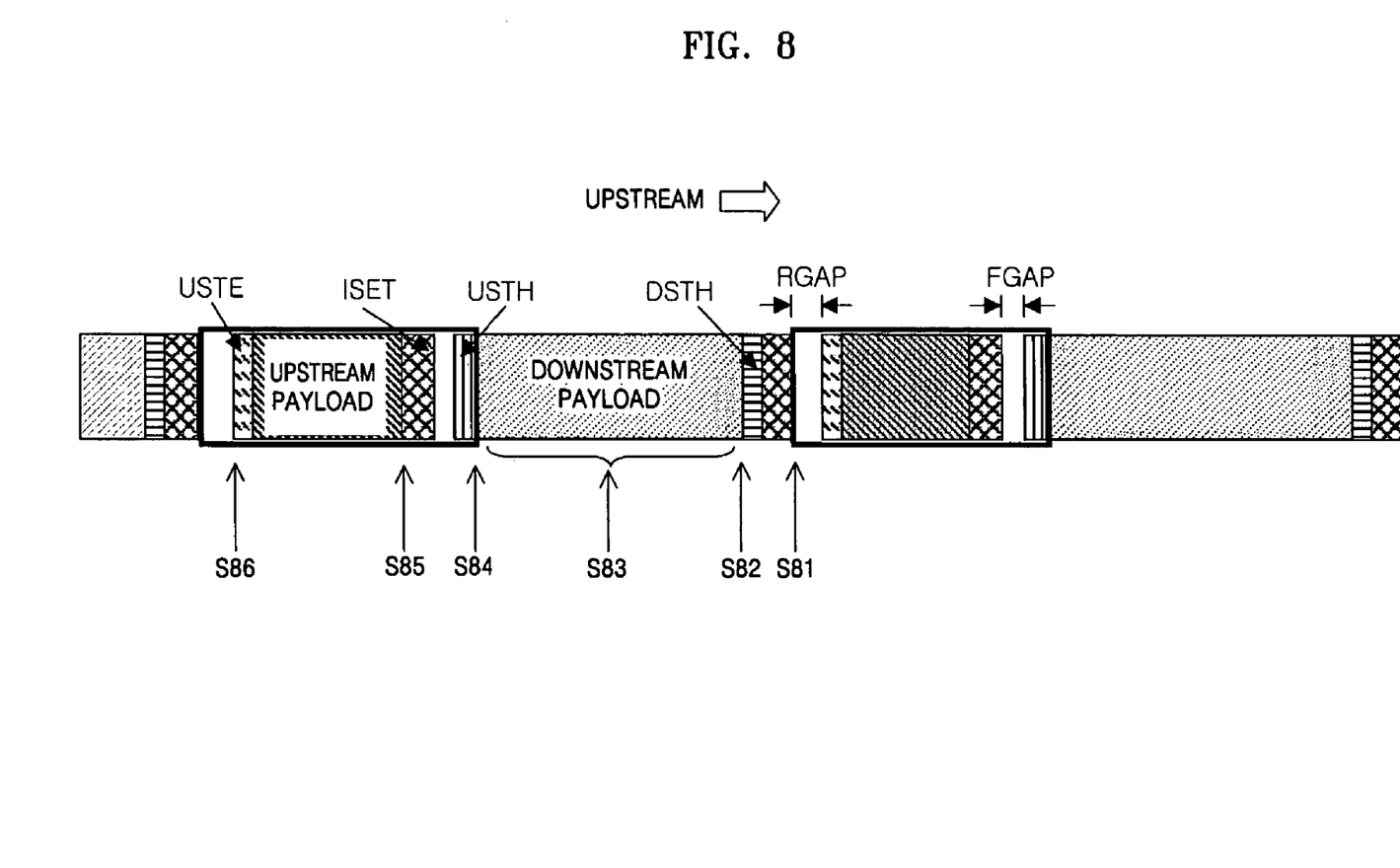
FIG. 8 illustrates an event generated due to processing of the overhead, which complies with an upstream packet format, when an OLT receives an upstream packet (frame)

FIG. 8 illustrates an event generated with processing of the overhead, which complies with an upstream packet format, when an OLT receives an upstream packet (frame). FIG. 9A will be quoted for convenience of understanding.

A receiving processing unit of the OLT operates in the resync mode in operation S81.

After detecting a DSTH, a PMA 95 operates in the sync mode while a PCS 93 operates in the resync mode in operation S82 (the resync mode, in which the PCS 93 considers the DSTH, which is not a standard code block, as a code validity fail and does not transfer user data to a MAC, is used to discard a downstream payload).

The receiving processing unit of the OLT prevents the PCS 93 from operating in the sync mode due to an idle code included in the downstream payload by generating an error code next the DSTH and transmitting the error code to the PCS 93. In other words, the receiving processing unit of the OLT maintains the PCS 93 to operate in the resync mode in operation S83.

The receiving processing unit of the OLT stops generating the error code, changes the operation mode of PMA 95 to the resync mode in order to synchronize again by a subsequently received ISET, and then transmits data to the PCS 93 in operation S84.

The PMA 95 and the PCS 93 operating in the resync mode receives upstream data in the sync mode by synchronizing again by the subsequently received ISET in operation S85.

The receiving processing unit of the OLT makes the PMA 95 and the PCS 93 operate in the resync mode by transmitting a USTE to the PCS 93 in operation S86. Here, a upstream bandwidth in a next cycle can be determined using an arriving time of the USTE and a up length bit count.

FIG. 9A illustrates a configuration of communication protocol layers installed in an OLT according to an embodiment of the present invention.

Referring to 9A, the MAC controller 91 performs transferring data between an upper layer and a framing/deframing processing unit 92, controlling data flows between the MAC and the upper layer, processing a MAC control protocol, and processing SDU transfer control.

The framing/deframing processing unit 92 frames downstream data or deframes upstream data. In a WDM-PON, the framing/deframing processing unit 92 commonly frames downstream data or deframes upstream data according to the Ethernet standard.

The PCS 93 performs an 8-bit/10-bit encoding/decoding, a code-group validity checking, and a PMA resynchronization.

A trailer control part 94 is a part in which the present embodiment is realized, transmits and receives data to and from other layers via a ten bit interface (TBI), inserts a USTH/DSTH into an upstream/downstream frame, detects a USTH/DSTH/USTE from an upstream/downstream frame, and includes the TCE 941 corresponding to the present embodiment in order to realize the transmitting, receiving, inserting and detecting functions. Detailed functions of the TCE 941 will be described later.

The PMA 95 transmits and receives physical signals, and optical sub-assembly (OSA) electronics 96 correspond to receiving/transmitting optical signals. Since detailed functions of the two elements are generally understood by those skilled in the art, description of the two elements are omitted.

Figure 9B:
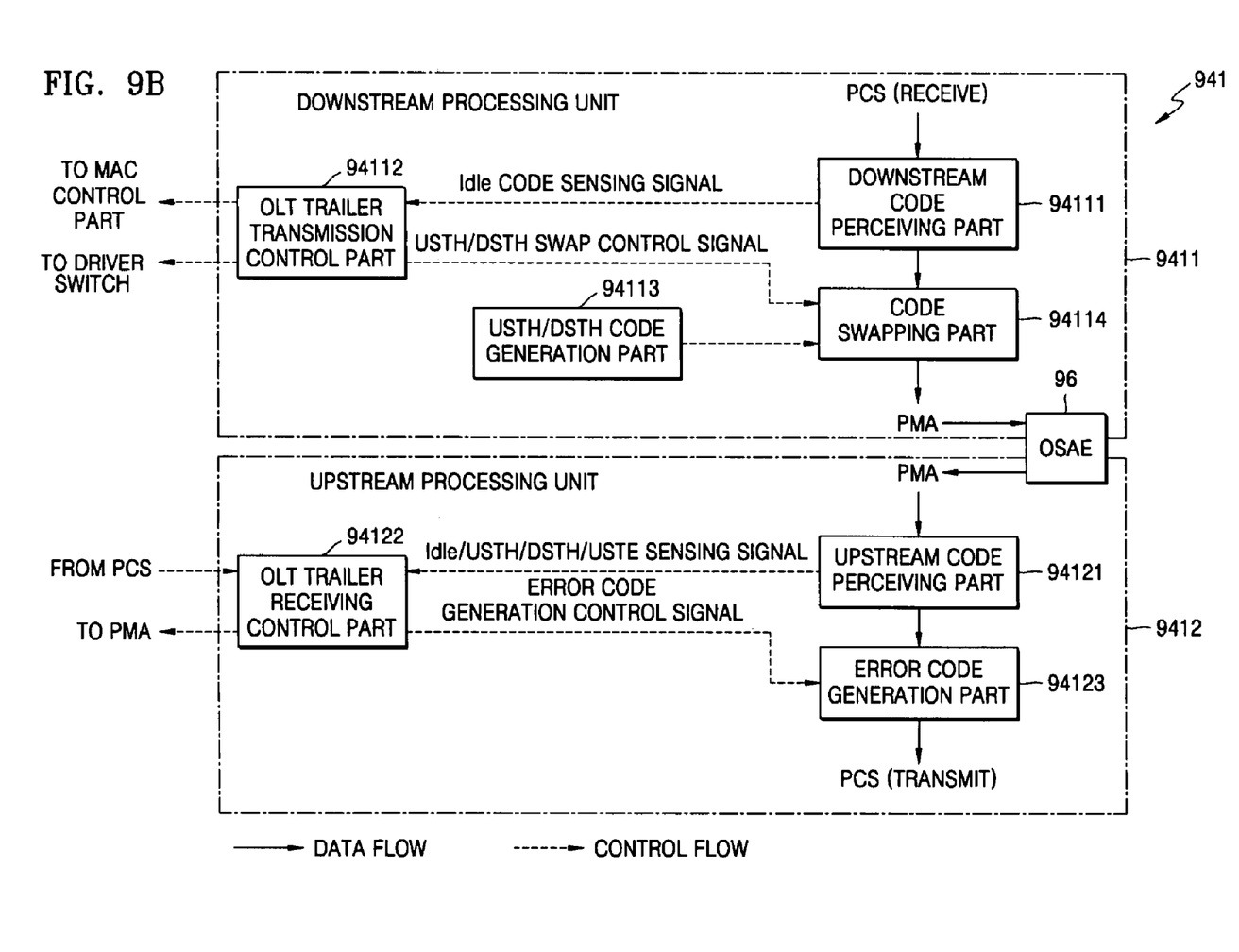
FIG. 9B is a detailed block diagram of a TCE included in the OLT illustrated in FIG. 9A.

FIG. 9B is a detailed block diagram of the TCE 941 included in the OLT illustrated in FIG. 9A.

Referring to FIG. 9B, the TCE 941 is largely divided into a downstream processing part 9411 and an upstream processing part 9412, and operations of the processing parts 9411 and 9412 will now be separately described.

[Downstream Processing Part 9411]

A downstream code perceiving part 94111 perceives an idle code by receiving downstream data from the PCS 93 and then transmits an idle code perceiving signal to an OLT trailer transmission control part 94112. Here, a matching process is required before transmitting the idle code perceiving signal since headers of a trailer are composed of predetermined bit patterns and the bit patterns(codes) can be detected only when received codes must be matched with codes stored in downstream processing part 9411.

The OLT trailer transmission control part 94112 receives the idle code perceiving signal, outputs an on/off control signal of SDU transmission to the MAC control part 91, and outputs an on/off control signal for controlling data received via a transmission line to the driver switch 961. Also, the OLT trailer transmission control part 94112 transmits a USTH/DSTH swap control signal to a code swapping part 94114.

A USTH/DSTH code generation part 94113 generates a USTH/DSTH code in advance and transmits the USTH/DSTH code to the code swapping part 94114. The code swapping part 94114 swaps the USTH/DSTH code for a K28.5 code by receiving the USTH/DSTH swap control signal from the OLT trailer transmission control part 94112. After swapping, the code swapping part 94114 transmits the downstream data received from the PCS 93 to the PMA 95, and the transmitted downstream data is transmitted to an ONT.

[Upstream Processing Unit 9412]

An upstream code perceiving part 94121 receives an upstream data frame from the PMA 95, perceives an idles code, a USTH, a DSTH, and a USTE from an upstream trailer of the upstream data frame, and transmits an idle/USTH/DSTH/USTE perceiving signal to an OLT trailer receiving control part 94122.

The OLT trailer receiving control part 94122 receives the idle/USTH/DSTH/USTE perceiving signal, transmits an on/off control signal of SDU transmission to the MAC controller 91, and receives a signal, which is for transferring sync fail information to the PMA 95, from the PCS 93 in order to check an operation mode of the PCS 93 (in detail, whether the PCS 93 operates in the resync mode or in the sync mode). Also, the OLT trailer reception control part 94122 transmits a control signal, which is for determining an operation mode of the PMA 95 in the sync/resync mode, to the PMA 95 and an error code generation control signal to an error code generation part 94123.

The error code generation part 94123 receives the error code generation control signal, generates an error code (why the error code is generated is described in FIG. 8), and transmits upstream data to the PCS 93.

FIG. 10A illustrates a configuration of communication protocol layers installed in an ONT according to an embodiment of the present invention.

Referring to FIG. 10A, the MAC controller 101 performs transferring data between an upper layer and a framing/deframing processing unit 102, controlling data flows between the framing/deframing processing unit 102 and the upper layer, and processing a MAC control protocol.

The framing/deframing processing part 102 deframes downstream data or frames upstream data. Like the OLT of FIG. 9A, the framing/deframing processing part 102 commonly deframes downstream data or frames upstream data according to the Ethernet standard.

The PCS 103 performs an 8-bit/10-bit encoding/decoding, a code-group validity check, and a PCS resynchronization.

Like the OLT in FIGS. 9A and 9B, a trailer control part 104 is a core layer to realize the present embodiment, transmits and receives data to and from other layers via a TBI, inserts a USTE into an upstream frame, detects a USTH/DSTH from an upstream/downstream frame, and substitutes DSTH 10-bit data by the K28.5 code. Like the OLT of FIG. 9A, the trailer control part 104 includes the TCE 1041, and detailed functions of the TCE 1041 will be described later.

Figure 10B:
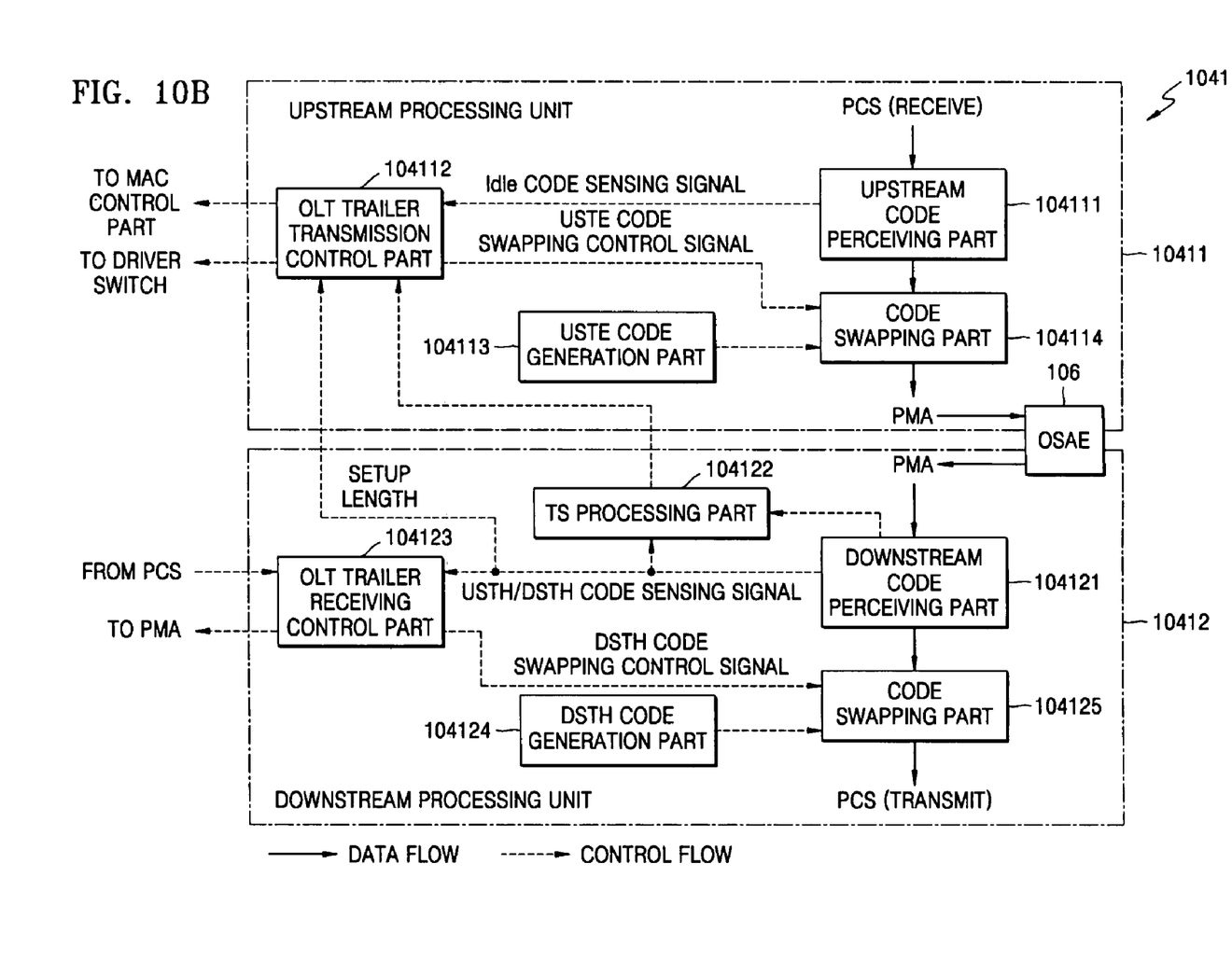
FIG. 10B is a detailed block diagram of a TCE included in the ONT illustrated in FIG. 10A.

FIG. 10B is a detailed block diagram of a TCE included in the ONT illustrated in FIG. 10A.

Referring to FIG. 10B, like in FIG. 9B, the TCE 1041 is largely divided into an upstream processing unit 10411 and a downstream processing unit 10412, and operations of the processing units 10411 and 10412 will now be separately described.

[Upstream Processing Unit 10411]

An upstream code perceiving part 104111 perceives an idle code by receiving upstream data from the PCS 93 and then transmits an idle code perceiving signal to an ONT trailer transmission controller 104112.

The ONT trailer transmission control part 104112 receives the idle code perceiving signal, outputs an on/off control signal of SDU transmission to the MAC controller 101, and outputs an on/off control signal for controlling data received via a transmission line to the driver switch 1061. Also, the ONT trailer transmission controller 104112 receives header information, such as a USTH and a DSTH, from a downstream code perceiving part 104121 and packet transmission timing information from a TS processing part 104122 and outputs a USTE code swapping control signal to a code swapping part 104114.

A USTE code generating part 104113 generates a USTE code in advance and outputs the USTE code to the code swapping part 104114. The code swapping part 104114 swaps the USTE code for a K28.5 code by receiving the USTE code swapping control signal from the ONT trailer transmission control part 104112 and transmits the upstream data received from the PCS 103 to the PMA 105.

[Downstream Processing Part 10412]

The downstream code perceiving part 104121 receives downstream data from the PMA 105, perceives a USTH/DSTH code, and transmits a USTH/DSTH code perceiving signal to an ONT trailer receiving control part 104123. Also, the downstream code perceiving part 104121 transmits the USTH/DSTH code perceiving signal to the ONT trailer transmission control part 104112. Since packet transmission timing is controlled by header information and TS information extracted by the downstream processing unit 10412,. ONT trailer transmission control part 104112 and ONT trailer reception receiving control part 104123 must share the header information and TS information. The downstream code perceiving part 104121 also transmits the USTH/DSTH perceiving signal to the TS processing part 104122 in order to calculate a transmission time.

The ONT trailer receiving control part 104123 receives sync fail information from the PCS 103 in order to check an operation mode of the PCS 103 (in detail, whether the PCS 103 operates in the resync mode or in the sync mode) and transmits a control signal to the PMA 105 in order to operate the PMA 105 in the sync/resync mode. Also, the ONT trailer receiving control part 104122 transmits a DSTH code swapping control signal to a code swapping part 104125.

The TS processing unit 104122 receives the USTH/DSTH code sensing signal from the downstream code perceiving part 104121, analyzes the TS information, and transmits a transmission time control signal (setup length) to the ONT trailer transmission receiving control part 104112 of the upstream processing part 10411 and the ONT trailer reception controller 104123.

A DSTH code generating part 104124 generates a DSTH code and transmits the DSTH code to the code swapping part 104125. The code swapping part 104125 receives the DSTH code swapping control signal from the ONT trailer receiving control part 104123, swaps the DSTH code for the K28.5 code, and transmits the downstream data to the PCS 103.

As described above, according to embodiments of the present invention, by inserting unique patterns indicating durations in which downstream and upstream information is loaded and extracting or inserting downstream and upstream data using a method of recognizing the patterns, downstream and upstream bandwidths can be controlled in realtime in response to a user request or a traffic transmission situation as compared with conventional packet transmission technology, an impulsive traffic burst, a feature of Internet traffic, can be smoothly accommodated, and a bandwidth waste can be minimized due to an efficient bandwidth use.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An apparatus for transceiving packets in a wavelength division multiplexing-passive optical network (WDM-PON), the apparatus comprising:
    a downstream code perceiving part perceiving an idle code from a downstream data frame to be transmitted to an optical network terminal (ONT);
    a trailer transmitting control part receiving an idle code perceiving signal from the downstream code perceiving part and forming a downstream trailer of the downstream data frame by adding an overhead for a reception control of the downstream data frame by the ONT and a transmission control of an upstream data frame to be loop-back transmitted from the ONT;
    an upstream code perceiving part receiving and perceiving an upstream trailer of the loop-back transmitted upstream data frame; and
    a trailer receiving control part controlling a receiving of the upstream data frame after receiving overhead information, which is added by the ONT, for a receiving control of the upstream data frame from the upstream code perceiving part.

2. The apparatus of claim 1, wherein the overhead added to the downstream trailer is composed of an ISET used for the ONT to synchronize, a DSTH indicating a beginning point of the downstream trailer, and a USTH indicating a beginning point of a region in which upstream data loop-backed from the ONT is loaded, and
    the trailer transmitting control part generates the downstream trailer by adding the overhead added to the downstream trailer to a downstream payload on which data actually provided to a user is loaded.

3. The apparatus of claim 1 or 2, further comprising:
    an error code generating part generating an error code for maintaining a sync state of the apparatus after the trailer receiving control part detects the DSTH.

4. An apparatus for transceiving packets in a WDM-PON, the apparatus comprising:
    a downstream code perceiving part receiving and sensing a downstream trailer, to which overhead for a receiving control of a downstream data frame transmitted from an optical line terminal (OLT) is added;
    a trailer receiving control part receiving a perceiving signal of the downstream trailer from the downstream code perceiving part and controlling a receiving of the downstream data frame;
    a TS processing part analyzing trailer size (TS) information of an upstream data frame to be loop-back-transmitted to the OLT by receiving the perceiving signal of the downstream trailer from the downstream code sensor;
    an upstream code perceiving part perceiving an idle code from the upstream data frame to be loop-back transmitted to the OLT; and
    a trailer transmission control part forming an upstream trailer by adding overhead for a transmission control of the upstream data frame after receiving an idle code perceiving signal from the upstream code sensor, a downstream trailer perceiving signal from the downstream code sensor, and the TS information from the TS processing part.

5. The apparatus of claim 4, wherein the overhead added to the downstream trailer includes a USTH,
the overhead added to the upstream trailer is composed of an FGAP used to detect the USTH and indicate time for requiring to load the upstream data on the upstream trailer, an ISET used for the OLT to synchronize, a USTE indicating an end of the upstream trailer, and a RGAP used to prevent the upstream trailer from being overlapped with the downstream trailer, and
the trailer transmission control part generates the upstream trailer by adding the overhead added to the upstream trailer to an upstream payload on which data actually requested by a user is loaded.

6. The apparatus of one of claims 1 through 5, wherein the sizes of all of the trailers are variably determined in response to a user request or a traffic situation.

* * * * *